(12) United States Patent
Tuttle et al.

(10) Patent No.: US 7,404,448 B2
(45) Date of Patent: Jul. 29, 2008

(54) COUPLER WITH SELF-LATCHING AND SELF-LOCKING LATCHING MECHANISM FOR A QUICK HITCH

(75) Inventors: Thomas B. Tuttle, Naperville, IL (US); Jon R. Hagarty, Darien, IL (US)

(73) Assignee: CNH America LLC, New Holland, PA (US)

( * ) Notice: Subject to any disclaimer, the term of this patent is extended or adjusted under 35 U.S.C. 154(b) by 323 days.

(21) Appl. No.: 10/969,141

(22) Filed: Oct. 20, 2004

(65) Prior Publication Data

US 2006/0082102 A1   Apr. 20, 2006

(51) Int. Cl.
*A01B 59/00* (2006.01)
(52) U.S. Cl. ................................ 172/677; 172/439
(58) Field of Classification Search ......... 172/677–680, 172/439, 272; 292/194, 202, 210, 216, 219, 292/224, 304
See application file for complete search history.

(56) References Cited

U.S. PATENT DOCUMENTS

| | | | | |
|---|---|---|---|---|
| 2,681,813 A | | 6/1954 | Seeburger | 286/456 |
| 2,727,757 A | | 12/1955 | Sawyer et al. | 280/504 |
| 2,919,754 A | * | 1/1960 | Walberg | 172/7 |
| 3,065,977 A | * | 11/1962 | Richardson et al. | 172/439 |
| 3,312,478 A | * | 4/1967 | Knaapi | 172/248 |
| 3,356,388 A | | 12/1967 | Prillinger et al. | 280/479 |
| 3,384,937 A | | 5/1968 | Muncke et al. | 24/238 |
| 3,404,901 A | | 10/1968 | Rau | 280/456 |
| 3,807,769 A | * | 4/1974 | Thompson et al. | 172/272 |
| 3,889,980 A | | 6/1975 | Geisthoff | 280/461 A |
| 3,977,698 A | | 8/1976 | von Allworden | 280/461 A |
| 4,019,753 A | | 4/1977 | Kestel | 280/415 A |
| 4,147,374 A | | 4/1979 | Jeffes | 280/478 R |
| 4,176,727 A | | 12/1979 | Perin | 180/53 R |
| 4,393,942 A | * | 7/1983 | Mijot et al. | 172/2 |
| 4,415,175 A | * | 11/1983 | Kainer | 172/272 |
| 4,549,744 A | * | 10/1985 | Herr et al. | 172/272 |
| 4,850,789 A | * | 7/1989 | Zimmerman | 414/703 |
| 4,944,354 A | * | 7/1990 | Langen et al. | 172/47 |
| 5,497,835 A | | 3/1996 | Laubner et al. | 172/272 |
| 6,053,545 A | * | 4/2000 | Asmundson et al. | 292/210 |
| 6,062,321 A | * | 5/2000 | Defrancq | 172/448 |
| 6,533,042 B1 | * | 3/2003 | Marine et al. | 172/272 |
| 7,059,419 B2 | * | 6/2006 | Greenwell | 172/272 |

* cited by examiner

*Primary Examiner*—Thomas B Will
*Assistant Examiner*—Jamie L McGowan
(74) *Attorney, Agent, or Firm*—Patrick M. Sheldrake; John William Stader; Michael G. Harms (57) ABSTRACT

A coupler for a hitch such as a quick hitch for a three point hitch of a work machine such as a tractor or the like, having a latching mechanism for holding a pin of a work element such as an implement or the like, in a receptacle of the coupler, which latching mechanism is self-latching and provides a self-locking capability when latched to hold the pin in the coupler, in opposition to, and in response to, forces and movements of the pin in directions for normally opening the coupler.

19 Claims, 5 Drawing Sheets

COUPLER WITH SELF-LATCHING AND SELF-LOCKING LATCHING MECHANISM FOR A QUICK HITCH

TECHNICAL FIELD

This invention relates generally to a coupler for a hitch such as a quick hitch for a three point hitch of a work machine such as a tractor or the like, and more particularly, to a coupler having a latching mechanism for holding a pin of a work element such as an implement or the like, in a receptacle of the coupler, which latching mechanism has a self-latching capability and provides a self-locking capability when latched to hold the pin in the coupler, in opposition to, and in response to, forces and movements of the pin in directions for opening the coupler.

BACKGROUND ART

Quick hitches for three point hitches of work machines such as tractors for agriculture, construction, and earth moving, for receiving and releasably holding a pin, such as a pin of an implement or other work element, are well known time saving devices.

Reference Schlegel et al. U.S. Pat. No. 6,349,959 B2 which discloses an exemplary quick hitch including couplers having a self-latching capability. However, couplers such as this rely on a force exerted by a spring to maintain a latch of the coupler in its closed or latched position, including in opposition to forces and movements exerted by a pin latched in the coupler operating in directions for opening the latch.

Relying on a spring force for maintaining a coupler in a latched condition can be disadvantageous. For instance, forces can be exerted by a work element through one or more pins held in a coupler in opposition to the spring force to urge the latch to partially or fully open. The pin can also be rotated while in forceful contact with the latch in a direction for moving the latch to its open position. For instance, as a tractor pulling an implement using a quick hitch is driven through a depression such as a ditch or swail in a field, the rear end of the tractor can be abruptly lowered relative to the implement being towed, such that pins of the implement are brought into contact with the latches of the couplers holding the pins and the pins simultaneously rotated in a direction for opening the latch, such that the latch can be partially opened.

Reference also von Allworden U.S. Pat. No. 3,977,698 issued Aug. 31, 1976 which discloses a hitch coupler including an exemplary locking latching mechanism for holding the latch in its closed position. However, such mechanism relies on interlocking components to provide the locking capability, which can be disadvantageous as the components add complexity and cost, and the interlocking capability can be degraded as the components wear and corrode.

Thus, what is sought is a hitch coupler, particularly a quick hitch for three point hitches of work machines such as tractors and the like, which includes a latching mechanism which can be both self-latching and self-locking, and overcomes one or more of the problems and disadvantages set forth above, and is simple in construction and advantageous cost-wise.

SUMMARY OF THE INVENTION

What is disclosed is a hitch coupler for a hitch such as a quick hitch for a three point hitch of a work machine such as a tractor or the like, which has both self-latching and self-locking capabilities, and overcomes one or more of the problems and disadvantages set forth above, and which is simpler in construction and complexity than known locking coupler constructions, and is advantageous cost-wise.

According to a preferred aspect of the invention, the coupler of the invention includes a body or hook shape portion, including opposing spaced apart first and second leg portions defining a receptacle therebetween, the receptacle being adapted for cooperatively receiving a pin, such as a common clevis pin of a work element such as an agricultural implement or the like, the receptacle having a closed end for receiving and holding the pin and an opposite open end through which the pin can pass into and out of the closed end. The latching mechanism includes a latch having a first end portion and an opposite second end portion, the first end portion of the latch being pivotally connected to the first leg portion of the coupler at a location outwardly of the receptacle beyond the open end thereof, for movement of the second end of the latch between an open or unlatched position beside the open end of the receptacle for allowing passage of a pin into and out of the closed end of the receptacle, and a closed or latched position spanning at least a substantial portion of the open end for preventing passage of a pin into and out of the closed end. The second end portion of the latch has a pin engaging surface which faces the closed end when the latch is in the closed position, and thus will face a pin located in the closed end. The pin engaging surface has a shape and is positioned and oriented with respect to the pivotal connection of the latch, such that when the latch is in the closed or latched position and a pin is received in the closed end and is urged against the pin engaging surface, and is either not rotated, or is rotated in a manner for urging the latch in the direction for closing, the latch will be urged thereby to pivot in a self-locking manner in the closing direction, and, importantly, even if the pin is rotated in contact with the pin engaging surface in a direction for pivoting the latch toward the open position, such as in the example above wherein a rear end of a tractor is driven through a depression while towing an implement, the latch will be urged thereby, also in a self-locking manner, against the pin for holding the pin in the closed end. In this latter instance, the pin is positioned as a physical barrier to further pivotal movement of the latch toward the open position, such that the latch always remains in an acceptable closed or latched condition.

The preferred pin engaging surface has a concave portion which is positioned and oriented so as to extend partially around the circumference of the pin so as to effectively cradle the pin. The concave portion is positioned when the latch is closed so as to be located between the pivot of the latch and the pin, or such that a line drawn through the bottom of the closed end of the receptacle and a pivotal axis of the latch will pass through about the center or middle of the concave portion when the latch is closed. The concave portion terminates at a projecting portion which projects outwardly therefrom on the side thereof adjacent to the second leg portion of the body or hook shape portion, such that if the pin is urged against the pin engaging surface and rotated in a direction so as to pivot the latch toward the open position, the projecting portion will be pivoted against the pin for holding the pin in the closed end, such that the latch remains securely closed and locked and will not open. In this latter instance, the pin will be positioned to block further pivotal movement of the latch toward the open position. Additionally, the pin engaging surface and the projecting portion are spaced a sufficient distance from an opposite surface in a deepest portion of the closed end of the receptacle, such that when a pin is located in the deepest portion, the latch, and particularly the projecting portion, can pass over the pin when being pivoted from the open position to the closed position and from the closed position to the open position, to allow easily and readily latching and unlatching the coupler.

The latch is preferably biased toward the closed position, for instance, by a resiliently yieldable biasing member, such as a spring or the like, associated with an unlatching element of the mechanism such as a rod, having one end connected to the latch and movable for pivoting the latch between the latched and unlatched positions. The unlatching element can be manually movable, for instance, by grasping and moving a handle connected on an opposite end of the rod, and/or it can be automatically moved, for instance using a servo device or the like, as desired.

The latching mechanism is preferably self-latching, that is, it is capable of receiving a pin when in the closed or latched position, then automatically latching, or it can be non-self-latching, if desired.

In operation, if self-latching, when the latch of the coupler is in the closed position, a pin of a work element, such as an element or the like, can be urged against a side edge portion of the latch to pivot the latch to the open position, and the pin simultaneously moved through the open end of the receptacle into the closed end thereof. If not self-latching, the latch can be opened using the unlatching element and the pin can then be moved through the open end of the receptacle into the closed end thereof. When the pin is deeply positioned in the closed end of the receptacle, the latch is then latched. The pin engaging surface of the latch will then be positioned between the pin and the pivotal connection of the latch such that if the pin is forceably moved against the latch, at least a substantial portion of any forces exerted by the pin against the latch will be directed through the latch and the pivotal connection to the body of the coupler, and so as to urge the latch to pivot in the direction for closing the latch. And, if the pin is forceably urged against the pin engaging surface and is rotated in contact therewith or otherwise applies a force against the latch for pivoting it in a direction for opening, any pivotal movement of the latch in the direction for opening the latch will bring the projecting portion of the pin engaging surface into contact with the pin so as to bear against the pin, to thereby hold the pin in the receptacle. Also, as a result of the position and extent of the projecting portion, as explained above, as long as the pin is thus held, the pin will serve to block the latch from pivotal movement further toward the open position, thereby preventing inadvertent unlatching.

DETAILED DESCRIPTION OF THE INVENTION

Figure 1:
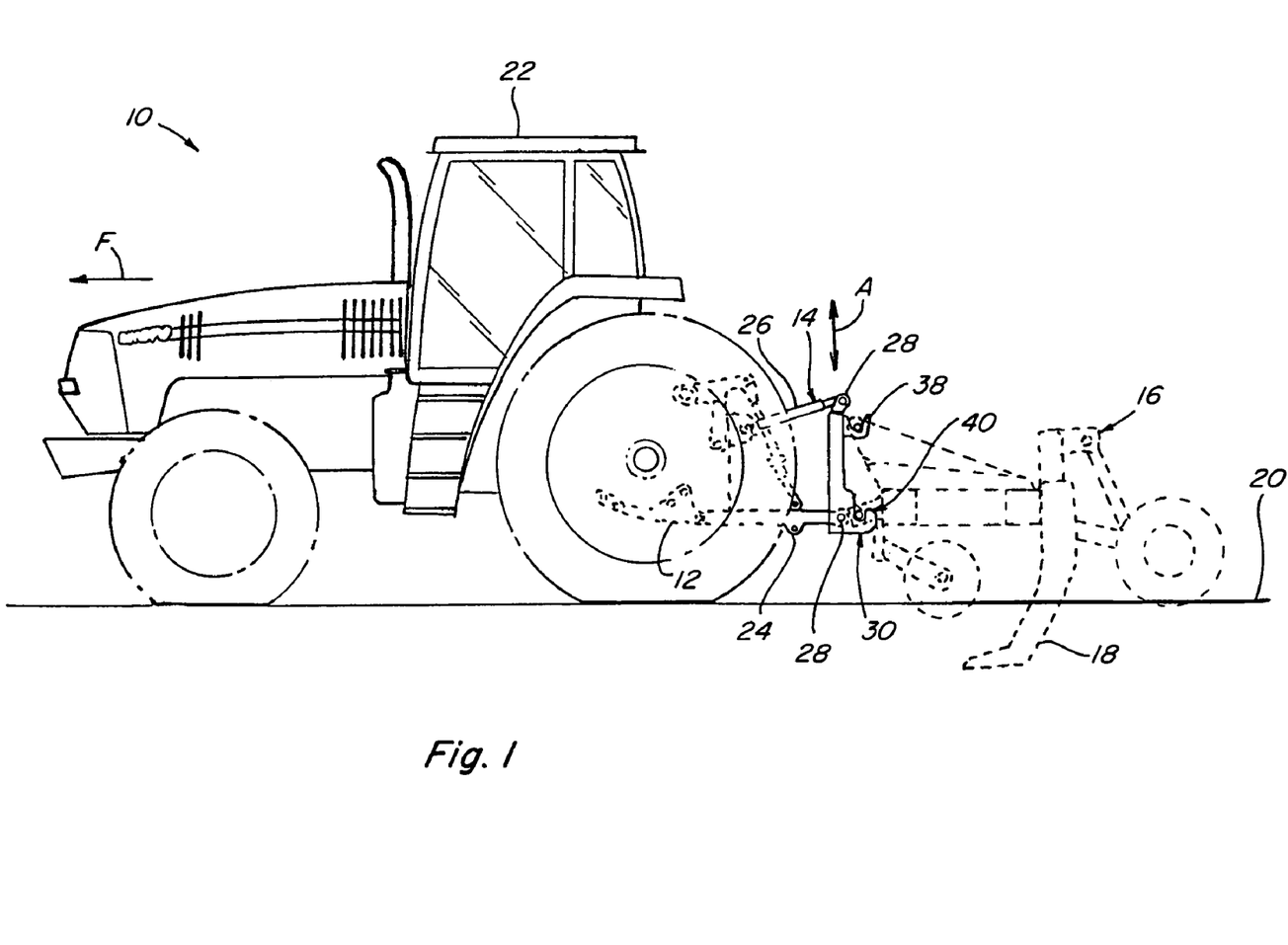
FIG. 1 is a simplified side view of a representative work machine which is a tractor including a three point hitch on a rear end thereof, and a quick hitch mounted on the three point hitch and including couplers each having a latching mechanism according to the invention, and showing a work element in hidden lines, coupled to the quick hitch.

Referring now to the drawings, in FIG. 1, a representative work machine 10, which is a tractor usable for agriculture and a wide variety of other purposes, is shown. Work machine 10 is of conventional construction and operation, and includes a rear end 12 supporting a conventional three point hitch 14, usable for connecting a work element, represented here by a agricultural implement 16, to rear end 12, for pulling by work machine 10. Here, agricultural implement 16 represents a well known, commercially available subsurface tillage tool or ripper having one or more tools 18 that move through the ground below a soil surface 20, for performing a desired tilling or ripping function as work machine 10 is moved forwardly over surface 20, as denoted by arrow F. To facilitate penetration of tool or tools 18 into the ground, the positioning thereof at a desired orientation and depth below surface 20, and also to allow transport of a work element such as implement 16 over the ground, with elements such as tools 18 about surface 20, three point hitch 14 is controllably movable upwardly and downwardly, as denoted by arrow A, using a control (not shown) in an operator cab 22 of machine 10, in the well known manner.

Generally, a three point hitch, such as hitch 14, will include a pair of rearwardly extending lift arms, represented by a left lift arm 24, at a lower location, and a rearwardly extending center link, at an upper location, all pivotally connected to rear end 12 and extending rearwardly therefrom, for connection to a work element, such as implement 16 shown, by a plurality of pins 28. To facilitate attachment and alignment, the lift arms represented by lift arm 24 and center link 26 are also variable in length. If connection of a work element directly to the three point hitch is desired, careful placement of the tractor, and often adjustment of the length of one or more of the lift arms and the center link, will be required, resulting in a time consuming operation. An operator may be required to change work elements or implements frequently enough such that significant amounts of time can be required.

Figure 2:
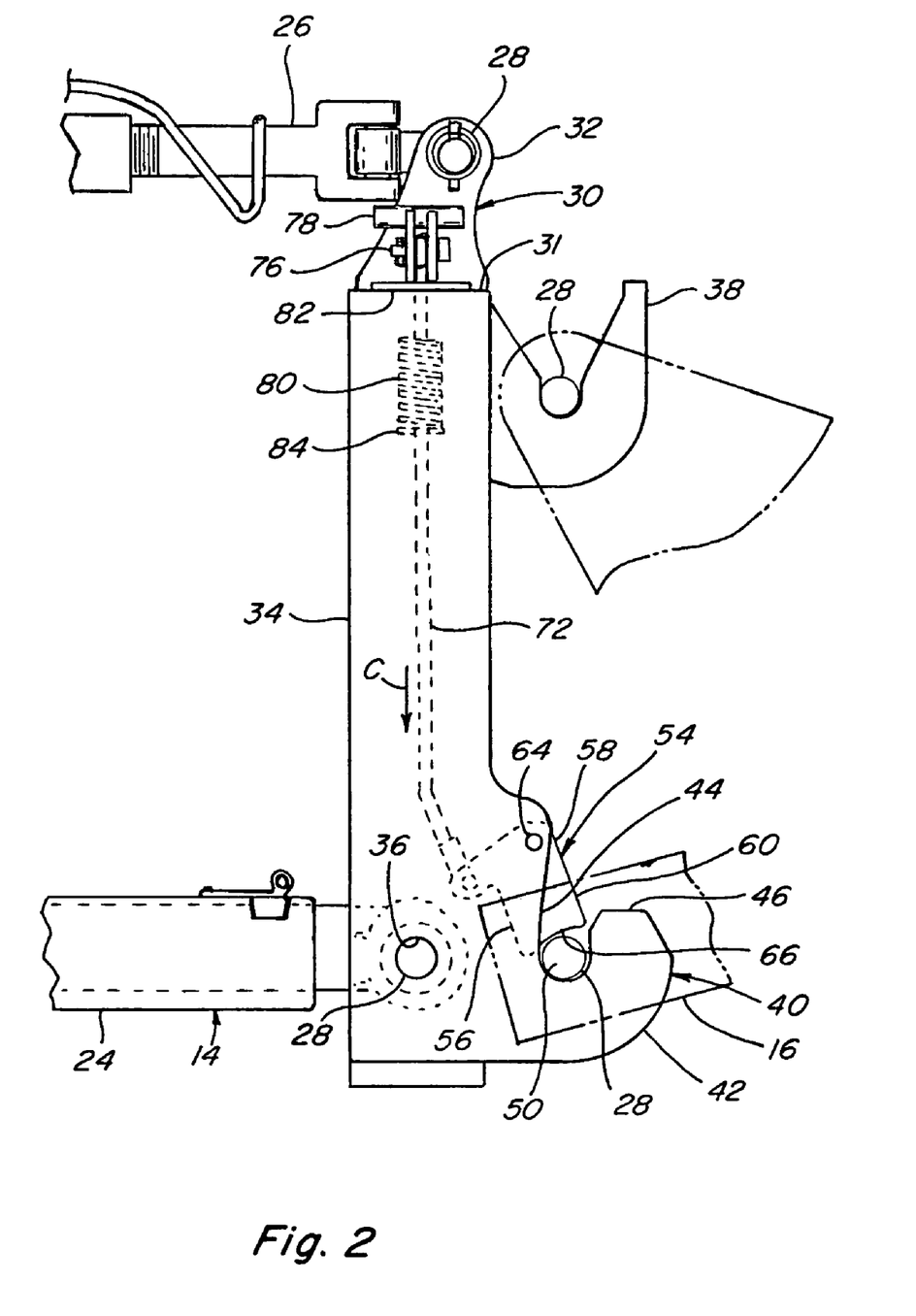
FIG. 2 is a simplified, enlarged fragmentary side view of the three point hitch of the work machine of FIG. 1, showing the quick hitch and a coupler thereof, and the latching mechanism of the coupler partially in hidden lines.

Referring also to FIG. 2, as a result of the time requirements for attachment of work elements directly to three point hitches, such as hitch 14, quick hitches represented by quick hitch 30, have come into widespread use. A quick hitch such as hitch 30 can be left on the three point hitch, and it can be coupled to, and uncoupled from, a work element such as implement 16 in a fraction of the time typically required to connect directly to a three point hitch and disconnect therefrom. As a result, a substantial amount of time is saved. A quick hitch is typically an inverted U or other shape structure which includes forwardly facing elements for connection to the three point hitch, and rearwardly facing elements which are positioned and operable for quickly and easily coupling to, and uncoupling from, a work element such as implement 16. Quick hitch 30 includes a generally horizontally extending upper member or cross bar 31 on which is mounted a center pin connection or center clevis 32, and a pair of legs which extend downwardly from the ends of cross bar 31, as represented by a left leg 34. Each leg, represented by left leg 34, includes a lower pin connection or clevis, represented by clevis 36. Upwardly and centrally located center clevis 32 and the lower devises of the legs, represented by clevis 36 of left leg 34, are accessible from the front, and receive and hold pins 28, such that pivotal connections can be made between center link 26 and center clevis 32, and between the lift arms, represented by lift arm 24, and the legs, represented by left leg 34. Cross bar 31 of quick hitch 30 supports a rearwardly facing center hook 38 at an upper center location, which is adapted for cooperatively receiving and holding a center pin on an upper center member of a work element, such as the upwardly located pin 28 of agricultural implement 16 shown.

Importantly, the lower end of each leg, as represented by left leg 34, includes a self-latching and self-locking coupler 40 constructed and operable according to the present invention, for cooperatively receiving and holding a pin, such as a pin 28 shown, for coupling to a lower member of the work element or implement as shown.

Referring also to FIGS. 3A, 3B, 3C and 3D, coupler 40 includes a hook shape body 42 having opposing, spaced apart first and second leg portions 44 and 46, respectively, defining a receptacle 48 therebetween having a lower closed end 50 and an opposite upper open end 52, ends 50 and 52 having an extent as measured between leg portions 44 and 46, which is at least marginally larger than a corresponding extent of a pin such as pin 28, to allow receipt of a pin 28 in closed end 50 and passage of the pin through open end 52. Here, it should be noted that although closed end 50 is depicted herein as being the lower end of receptacle 48, and open end 52 the upper end, the orientation of receptacle 48 is not material to the present invention, and thus, either of the ends could be the upper or lower end, and receptacle 48 could alternatively be oriented such that the ends are at about the same level.

Figure 3A:
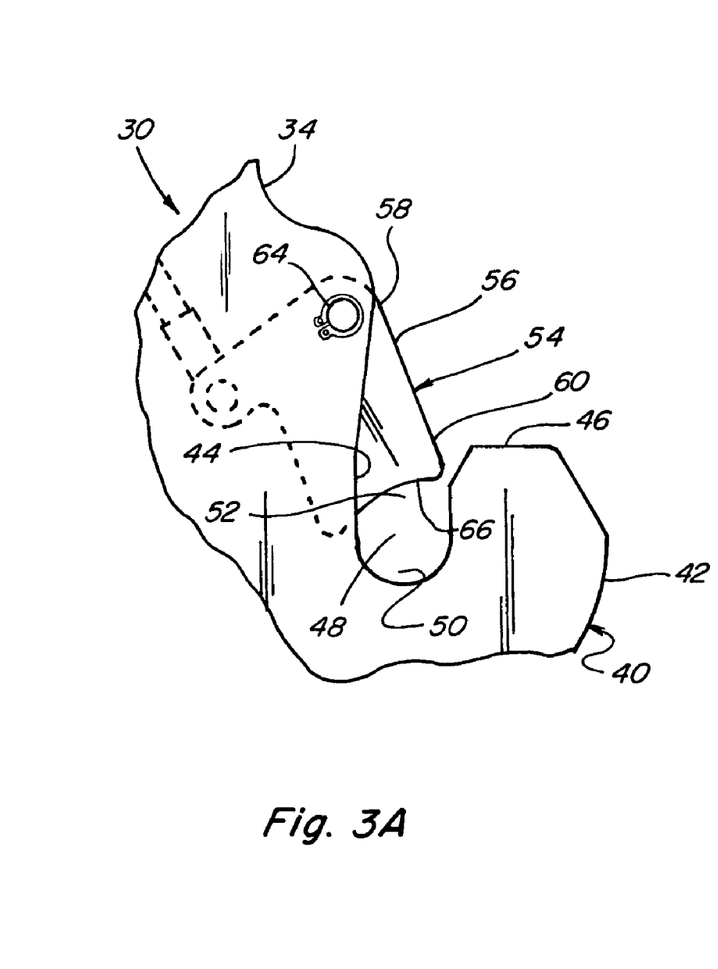
FIG. 3A is an enlarged fragmentary side view of the coupler of FIG. 2, and showing the latching mechanism in a closed position.

Coupler 40 includes a latching mechanism 54 including a latch 56 having a first end portion 58 and an opposite second end portion 60. Latch 56 is disposed in a slot 62 in first leg portion 44 of body 42. Slot 62 opens to and faces and is generally co-extensive with receptacle 48 lengthwise. First end portion 58 of latch 56 is pivotally connected to first leg portion 44 by a pivot pin 64 extending across slot 62 at a location outwardly of receptacle 48 beyond open end 52 thereof, for pivotal movement of second end portion 60 between an open position beside open end 52 of receptacle 48 (FIG. 3B) for allowing passage of a pin such as pin 28 into and out of closed end 50, and a closed position spanning at least a substantial portion of open end 52 (FIGS. 2 and 3A). Second end portion 60 has a pin engaging surface 66 which importantly is positioned and oriented at least substantially as shown relative to pivot pin 64, for facing closed end 50 of receptacle 48 when latch 56 is in the closed position, so as to face a pin, such as pin 28, located in closed end 50, and such that latch 56 is disposed between the pin and pivot pin 64, for providing a self-locking feature for holding the pin in closed end 50, as will be explained next.

Figure 3B:
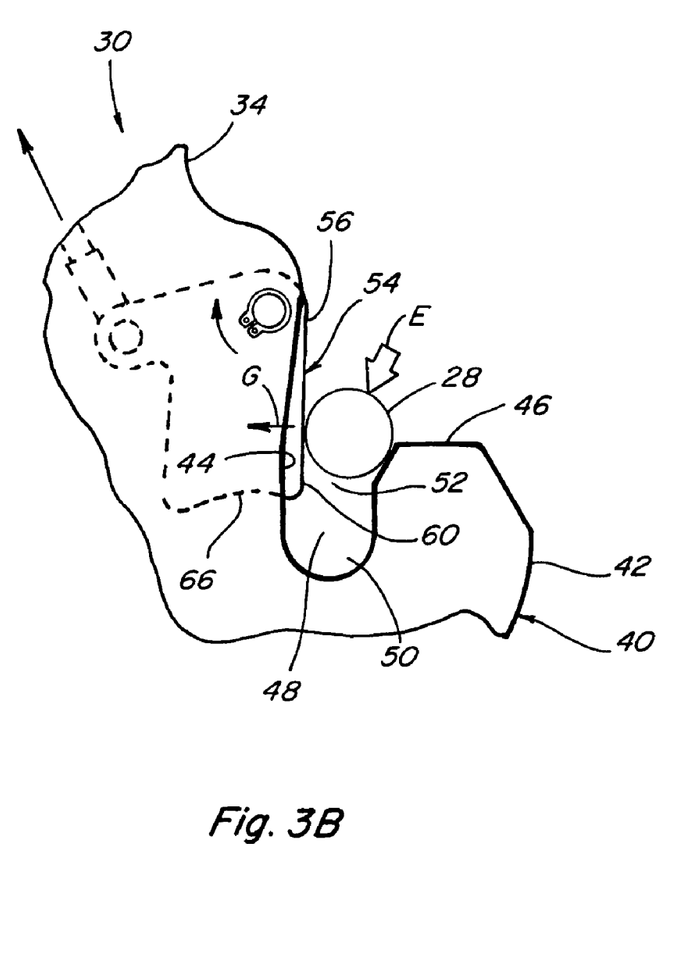
FIG. 3B is another enlarged fragmentary side view of the coupler, showing the latching mechanism being pivoted to an open position by a pin moved against the latch of the coupler, illustrating a self-latching capability.
Figure 3C:
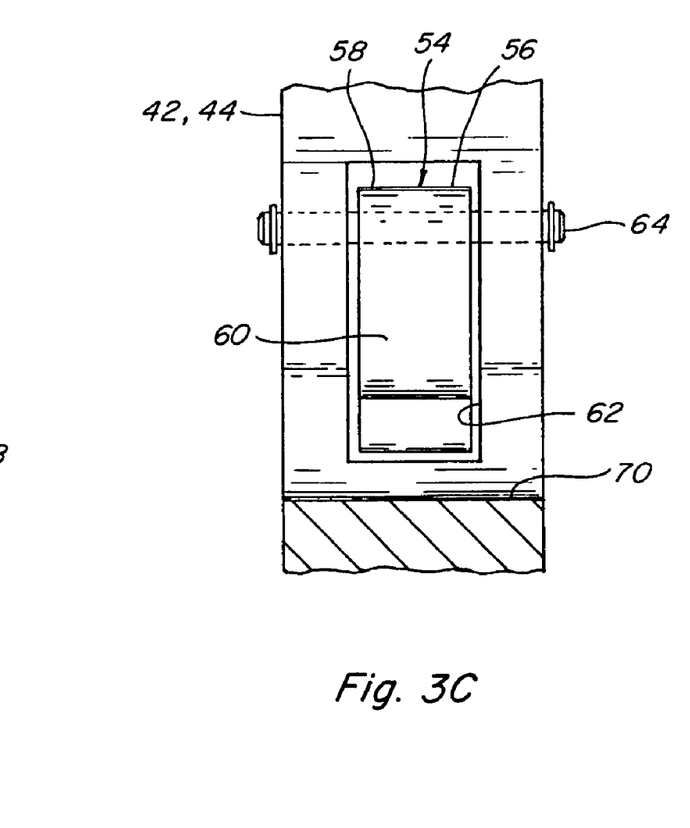
FIG. 3C is an enlarged fragmentary rear end view of a body portion of the coupler, showing a latch of the latching mechanism in a slot therein.
Figure 3D:
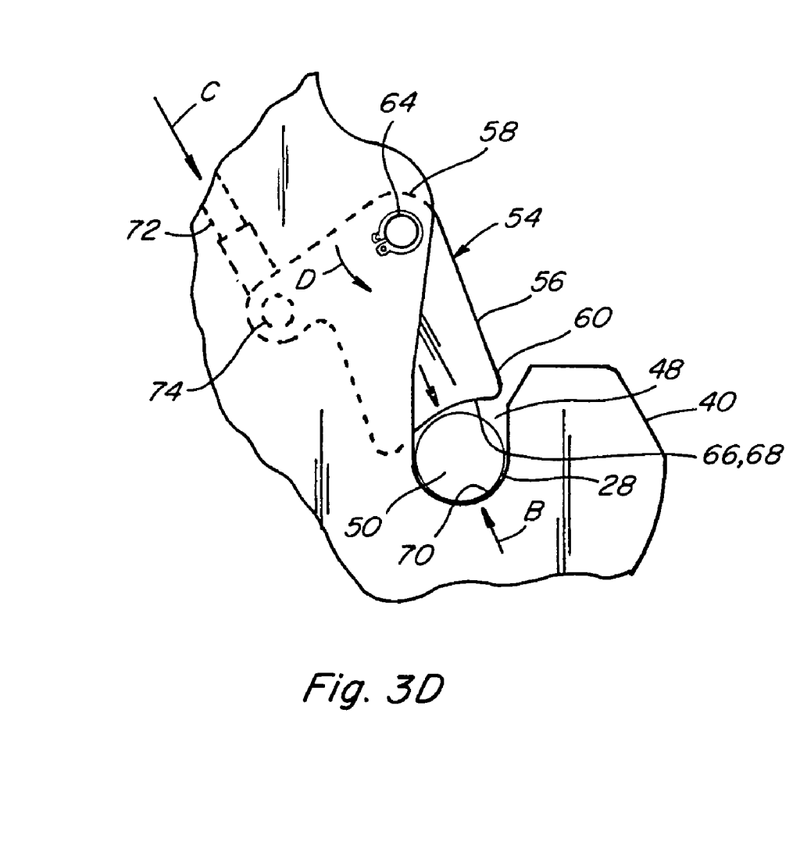
FIG. 3D is another enlarged side fragmentary view of the quick hitch and coupler, with the latching mechanism in the closed position locking the pin in the receptacle.

Referring more particularly to FIG. 3D, pin engaging surface 66 preferably has a concave shape portion 68 which, when latch 56 is closed, has a central or middle portion which is located a predetermined distance, denoted by distance B generally along a line extending from a deepest surface 70 at a central location within closed end 50 though open end 52 of receptacle 48 and pivot pin 64, which distance B is marginally greater than a diametrical extent of a pin, such as pin 28, to be received and held in receptacle 48. Latching mechanism 54, as best shown in FIG. 2, additionally includes an elongate rod 72 one end of which is pivotally connected by a pin 74 to first end portion 58 of latch 56. Rod 72 extends through an internal passage through body 42 of leg 34 and has an opposite end pivotally connected by a pin 76 to a handle 78 located on top of leg 34 and cross bar 31. Handle 78 is manually pivotally movable for moving rod 72 in a downward direction, denoted by arrow C, toward coupler 40, for pivoting latch 56 in a counterclockwise direction about pivot pin 64, as denoted by arrow D, such that second end portion 60 is pivoted into the closed position, as shown in FIGS. 2, 3A and 3D. Rod 72 is urged in the direction C by a resiliently yieldable biasing element 80, which is preferably a coil compression spring, retained between an upper interior surface 82 of side bar 34, and a lower spring retainer 84 located on rod 72. Handle 78 is also movable to an open position for moving actuating rod 72 in the direction opposite arrow C, for pivoting latch 56 in the clockwise direction, such that second end portion 60 will be pivoted into slot 62 to the open position (FIG. 3B), to allow passage of a pin, such as pin 28, through open end 52 of receptacle 48, into or out of closed end 50.

Referring more particularly to FIG. 3B, latching mechanism 54 provides a self-latching capability. Latch 56 preferably has an elongate side edge portion 86 extending between first and second end portions 58 and 60, so as to extend along first leg portion 44 of body 42 when in the open position, and so as to generally diagonally span open end 52 when in the closed position (FIGS. 2, 3A and 3D). As a result, a pin, such as pin 28, can be forcefully urged, as denoted by large arrow E into open end 52 of receptacle 48 and against side edge portion 86, for instance, as a result of lifting hitch 14 (as denoted by upwardly directed arrow A in FIG. 1) for applying a biasing force, denoted by arrow G, against side edge portion 86, to pivot latch 56 in a clockwise direction about pivot pin 64 and in opposition to biasing element 80, such that element 80 will resiliently yield to allow latch 56 to pivot to its open position for passage of the pin through open end 52 and into closed end 50. Once the pin is past second end portion 60 of latch 56, biasing element 80 will expand to resiliently pivot latch 56 in direction D (FIG. 3D) back to the closed position, for holding the pin in closed end 50. Here, it should be noted that, if desired, latch 56 can instead be moved to its open position using handle 78, then, once the pin is fully received in closed end 50, closed using handle 78.

Figure 4:
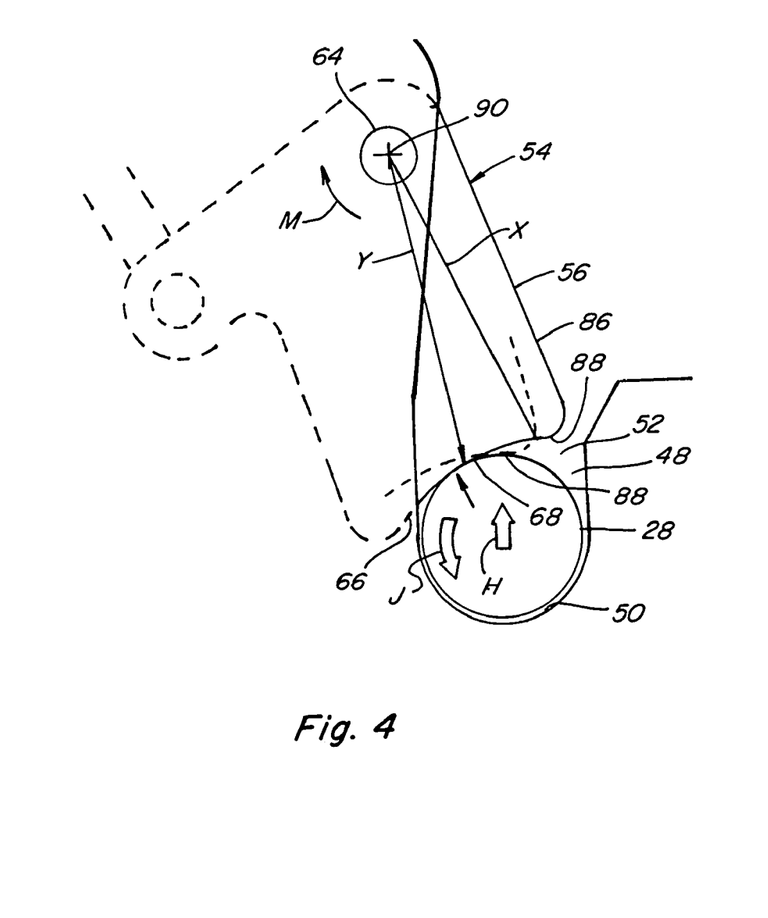
FIG. 4 is a simplified schematic side representation of the coupler, showing the latch in the closed position locking a pin in the receptacle, and illustrating forces acting on the latch as a result of movement of the pin toward an open end of the receptacle and rotation of the pin in a direction for pivoting the latch toward the open position.
Figure 5:
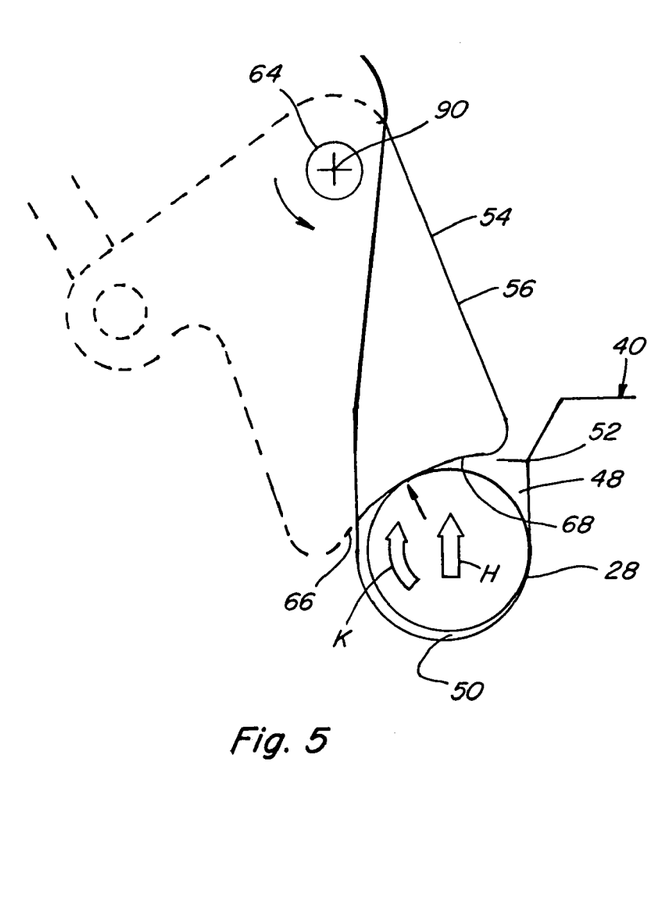
FIG. 5 is another simplified schematic side representation of the coupler, showing the latch in the closed position locking a pin in the receptacle, and illustrating forces acting on the latch as a result of movement of the pin toward an open end of the receptacle and rotation of the pin in a direction for pivoting the latch toward the closed position.

Referring also to FIGS. 4 and 5, when a pin such as pin 28 is latched by latching mechanism 54 in closed end 50 of receptacle 48, an important advantage of the position of latch 56 and the position and orientation and shape of pin engaging surface 66 is that they facilitates the self-locking function by causing latch 56 to securely hold a pin, such as pin 28, in closed end 50, even when the pin is moved under significant force toward open end 52, as denoted by arrow H, and rotated in either a direction for or otherwise applying a force against latch 56, for pivoting latch 56 toward its open position, as denoted by arrow J in FIG. 4, or in the opposite direction, as denoted by arrow K in FIG. 5. Referring more particularly to FIG. 4, at a juncture with side edge portion 86, pin engaging surface 66 includes a projecting portion 88 which extends a greater distance from an axis 90 of pivotal movement of latch 56 about pivot pin 64 compared to a central region of concave shape portion 66, as denoted by arrows X and Y, respectively, such that any pivotal movement of latch 56 in a direction M caused by the rotation of pin 28 in contact with surface 66, will cause projecting portion 88 to contact the surface of pin 28, such that pin 28 will block and prevent or interfere with further pivotal movement of latch 56 in direction M to any partially open position sufficient for passage of pin 28 through open end 52. In this way, concave shape portion 68 of pin engaging surface 66 and projecting portion 88 cooperate to provide a self-locking feature for securely holding a pin such as pin 28 in closed end 50, while still allowing free rotation of the pin.

Referring more particularly to FIG. 5, forceful movement of a pin, such as pin 28, toward open end 52 sufficient to cause latch 56 of mechanism 54 to pivot toward its closed position, as denoted by arrow D, will cause latch 56 to thus pivot in that direction, or hold it in the fully closed position, thereby also locking pin 28 in the closed end.

As an example, referring again to FIGS. 1, 2 and 4, if rear end 12 of work machine were lowered relative to implement 16, for instance, as a result of travel into a depression such as a ditch or hole in soil surface 20, such that the pin 28 in coupler 40 is brought upwardly and forcefully against pin engaging surface 66 in a manner to urge latch 56 in a direction for opening, projecting portion 88 will be brought to bear against pin 28, to thereby hold it in receptacle 48, and hold latch 56 in its closed position.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A coupler for a hitch, comprising:
    a body including opposing spaced apart first and second leg portions defining a receptacle therebetween, the receptacle having a closed end for receiving and holding a pin and an opposite open end through which a pin can pass into and out of the closed end;
    a self-locking latch disposed in a slot in the first leg portion, the latch having a first end portion and an opposite second end portion, the first end portion of the latch being pivotally connected to the first leg portion at a location outwardly of the receptacle beyond the open end thereof for movement of the second end of the latch between an open position beside the open end of the receptacle for allowing passage of a pin into and out of the closed end of the receptacle and a closed position spanning at least a substantial portion of the open end for preventing passage of a pin into and out of the closed end, wherein when in the open position the latch is pivoted toward the slot in the first leg and further wherein when in the closed position the latch is pivoted in a direction away from the slot generally toward the second leg portion and away from the closed end of the receptacle, the second end portion of the latch having a pin engaging surface which faces the closed end when the latch is in the closed position, the pin engaging surface being shaped and oriented to face away from the pivotal connection of the latch to the first leg portion to provide a self-locking capability when the latch is in the closed position such that if a pin received in the closed end is urged against the pin engaging surface the latch will be urged thereby to pivot in a closing direction toward the closed position for holding the pin in the closed end, and such that if a pin received in the closed end is rotated in contact with the pin engaging surface in a direction for pivoting the latch toward the open position the latch will be urged thereby against the pin for holding the pin in the closed end wherein contact with the pin prevents the latch from rotating to the open position.

2. The coupler of claim 1, wherein the pin engaging surface terminates at a projecting portion which is positioned and oriented such that when the latch is in the closed position and a pin received in the closed end is urged against the pin engaging surface and rotated in a direction so as to pivot the latch toward the open position the projecting portion will be pivoted against the pin for holding the pin in the closed end.

3. The coupler of claim 2, wherein the pin engaging surface is located a first predetermined distance from an axis of pivotal movement of the latch, and the projecting portion is located a second predetermined distance from the axis greater than the first predetermined distance, such that when a pin is located in the closed end of the receptacle in contact with a concave portion of the latch and is rotated in the direction to pivot the latch toward the open position the projecting portion will be urged thereby into contact with the pin such that the pin will block further pivotal movement of the latch toward the open position for holding the pin in the closed end.

4. The coupler of claim 2, wherein the projecting portion is positioned so as to be located adjacent to the second leg portion when the latch is in the closed position.

5. The coupler of claim 1, wherein the pin engaging surface has a concave shape adapted to provide a clearance space between the latch and the pin when located in a deepest position in the closed end of the receptacle farthest from the open end, to allow pivotal movement of the latch between the open and closed positions.

6. The coupler of claim 5, wherein the location that the first end portion of the latch is pivotally connected to the first leg lies on a line extending through the closed and open ends of the receptacle.

7. The coupler of claim 5, wherein the open end of the receptacle has a predetermined sideward extent as measured between the legs, and the latch when in the closed position extends at least three quarters of the sideward extent across the open end.

8. The coupler of claim 1, wherein the coupler is an element of a quick hitch for a three point hitch.

9. A self-latching and self-locking coupler for a quick hitch comprising:
    a body including first and second leg portions defining a receptacle therebetween, the receptacle having a closed end for receiving a pin and an opposite open end through which a pin can pass into and out of the closed end, the first leg portion including a slot therein extending along the receptacle; and
    a self-locking latching mechanism including a latch disposed for pivotal movement in the slot between an open position beside the open end of the receptacle and a closed position extending at least partially across the open end, and a resilient biasing element for resiliently holding the latch in the closed position, the latch having a first end portion pivotally connected to the first leg portion at a location in the slot and outwardly from the receptacle beyond the open end thereof, a second end portion opposite the first end portion, and a side edge portion extending between the first and second end portions, the second end portion of the latch having a pin engaging surface which faces the closed end when the latch is in the closed position and which has a projecting portion at a juncture with the side edge portion which extends toward the closed end of the receptacle adjacent to the second leg portion, such that the latch must be pivotally moved from the closed position to the open position for passage of a pin into and out of the receptacle, the resilient biasing element being operable for automatically returning the latch to the closed position after being pivoted therefrom to the open position, and the pin engaging surface being shaped and oriented to provide a self-locking function when the latch is in the closed position such that if a pin located in the closed end is urged toward the open end against the pin engaging surface the latch will be pivoted thereby toward the closed position for holding the pin in the closed end, and such that if a pin located in the closed end is rotated against the pin engaging surface in a direction for pivoting the latch toward the open position, the projecting portion of the latch contacts the pin thereby preventing further movement of the latch toward the open position.

10. The coupler of claim 9, wherein the pin engaging surface has a concave shape portion positioned so as to extend across the open end of the receptacle when the latch is in the closed position for engaging a pin located in the closed end of the receptacle.

11. The coupler of claim 10, wherein the concave shape is adapted to provide a clearance space between the latch and a pin located in the closed end of the receptacle to allow pivotal movement of the latch from the closed position to the open position to allow passage of the pin from the receptacle.

12. The coupler of claim 9, further comprising an element connected to the latch and manually movable for pivoting the latch between the open and closed positions.

13. The coupler of claim 9, wherein the open end of the receptacle has a predetermined sideward extent between the first and second leg portions, and when the latch is in the closed position, the second end portion thereof extends across at least about three-fourths of the sideward extent of the open end.

14. A quick hitch for a work machine, comprising:
a member having a hook shape portion including a receptacle having a closed end for receiving a pin and an opposite open end through which a pin can pass into and out of the closed end, the hook shape portion including an elongate side extending along a first side of the receptacle and outwardly beyond the open end; and
a self-locking latch disposed in a slot in the first side of the receptacle, the latch having a first end portion pivotally mounted by a pivot to the elongate side of the hook shape portion at a location outwardly of the receptacle beyond the open end thereof, the latch having a second end portion opposite the first end portion pivotally movable between a closed position extending at least substantially across the open end of the receptacle and an open position beside the first side of the receptacle, wherein when in the closed position the latch is pivoted in a direction away from the slot generally away from the closed end of the receptacle and further wherein when in the open position the latch is pivoted toward the slot in the first side, the second end portion of the latch having a pin engaging surface which when the latch is in the closed position faces the closed end of the receptacle and is positioned such that a force exerted by a pin located in the closed end against the pin engaging surface toward the open end will urge the latch to pivot toward the closed position, and a force exerted by a pin located in the closed end against the pin engaging surface in a direction for pivoting the latch toward the open position will cause the latch to be forced against the pin for holding the pin in the receptacle, wherein contact with the pin prevents the latch from rotating to the open position.

15. The quick hitch of claim 14, wherein the latch further comprises a side edge portion extending between the first and second end portions positioned to face away from and extend diagonally across at least a portion of the open end of the receptacle when the latch is in the closed position, such that the latch can be pivoted from the closed position to the open position by a pin pressed against the side edge portion.

16. The quick hitch of claim 15, further comprising an element yieldably biasing the latch toward the closed position.

17. The quick hitch of claim 16, wherein the pin engaging surface of the latch has a concave shape portion which when the latch is in the closed position extends across at least half of the open end of the receptacle.

18. The quick hitch of claim 17, wherein the pin engaging surface includes a projecting portion disposed between the concave portion and the side edge portion in a position such that if a pin located in the closed end of the receptacle exerts a force against the pin engaging surface in a direction for pivoting the latch toward the open position, the projecting portion will be brought thereby into contact with the pin such that further pivoting of the latch toward the open position will be blocked by the pin and the latch will hold the pin in the receptacle.

19. The quick hitch of claim 14, further comprising an element connected to the latch and manually movable for pivoting the latch between the open and closed positions.

* * * * *